(12) United States Patent
Allred

(10) Patent No.: US 6,665,693 B1
(45) Date of Patent: Dec. 16, 2003

(54) DIGITAL SIGNAL PROCESSING CIRCUITS, SYSTEMS, AND METHODS IMPLEMENTING APPROXIMATIONS FOR A RECIPROCAL

(75) Inventor: Rustin W. Allred, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/447,461

(22) Filed: Nov. 22, 1999

Related U.S. Application Data

(60) Provisional application No. 60/109,882, filed on Nov. 25, 1998.

(51) Int. Cl.[7] .................................................. G06F 7/52
(52) U.S. Cl. ....................................... 708/270; 708/502
(58) Field of Search ............................ 708/270, 502, 708/654

(56) References Cited

U.S. PATENT DOCUMENTS

| | | | | |
|---|---|---|---|---|
| 4,482,975 A | * | 11/1984 | King et al. ..................... | 708/9 |
| 5,862,059 A | * | 1/1999 | Matula et al. .............. | 708/270 |
| 6,163,791 A | * | 12/2000 | Schmookler et al. ....... | 708/502 |
| 6,223,192 B1 | * | 4/2001 | Oberman et al. ........... | 708/270 |
| 6,260,054 B1 | * | 7/2001 | Rosman et al. ............. | 708/502 |

OTHER PUBLICATIONS

"Computation of the Base Two Logarithm of Binary Numbers," IEEE Trans. Electron. Comput., EC–14, pp. 863–867, 1995 (M. Combet, H. Van Zonneveld, and L. Verbeek).

"New Algorighms for the Approximate Evaluation of Hardware of Binary Logarithms and Elementary Functions," IEEE Trans. Comput., C–21, pp. 1416–1421, 1972 (D. Marino).

"A Note on Base–2 Logarithm Computations," IEEE Proc., 61, pp. 1519–1520, 1973 (J.C. Majithia and D. Levan).

"A Class of Algorighms for Ln x, Exp x, Sin x, Cos x, Tan^–1 x and Cot^–1 x, " IEEE Trans. Electron. Comput., EC–14, pp. 85–86, 1965 (W. H. Specker).

* cited by examiner

Primary Examiner—David H. Malzahn
(74) Attorney, Agent, or Firm—Frederick J. Telecky, Jr.; W. James Brady, III

(57) ABSTRACT

A digital signal system (10, 100) for determining an approximate reciprocal of a value of x. The system includes an input (12) for receiving a signal, and circuitry (18) for measuring an attribute of the signal. The measured attribute relates at least in part to the value of x. The system further includes circuitry (104) for identifying a bounded region within which x falls. The bounded region is one of a plurality of bounded regions, and each bounded region has a corresponding slope value and first and second endpoints. The system further includes circuitry (106, 108, 110) for determining the approximate reciprocal by adjusting a reciprocal value at one of the first and second endpoints by a measure equal to a distance of the value of x from the one of the first and second endpoints times the slope value corresponding to the bounded region within which x is identified as falling.

23 Claims, 2 Drawing Sheets

US 6,665,693 B1

DIGITAL SIGNAL PROCESSING CIRCUITS, SYSTEMS, AND METHODS IMPLEMENTING APPROXIMATIONS FOR A RECIPROCAL

This application claims priority under 35 USC § 119 (e) (1) of Provisional Application No. 60/109,882, filed Nov. 25, 1998.

CROSS REFERENCES TO RELATED APPLICATIONS

U.S. patent application Ser. No. 09/408,097 filed 09/27/99.

STATEMENT REGARDING FEDERALLY SPONSORED RESEARCH OR DEVELOPMENT

Not Applicable.

BACKGROUND OF THE INVENTION

The present embodiments relate to signal processing, and are more particularly directed to digital signal processing circuits, systems, and methods implementing approximations for a reciprocal.

Digital signal processing is prevalent in numerous types of contemporary technologies, and involves various types of devices, signals, and evaluations or operations. For example, devices involved in signal processing may include a general purpose digital signal processor ("DSP"), an application specific processor, ("ASP"), an application specific integrated circuit ("ASIC"), a microprocessor, or still others. The types of processed signals may include various types of signals, where audio signals are a relevant example for reasons detailed below. Lastly, the operations on these signals may include numerous logic and arithmetic-type operations, where such operations may occur with a general purpose arithmetic logic unit or dedicated hardware/software included within the device performing the signal processing. The present embodiments arise within these considerations, as further explored below.

Given the various device types, signals, and operations involved in signal processing, it is recognized in connection with the present embodiments that the precision involved with some types of signal processing may be less than that required in other contexts. For example, the precision expected of a mathematical calculation performed by a hand held calculator or central processing unit may be considered to define a standard that is relatively high, while the precision required of some other signal processing may be lower than this high standard. One example where lower precision in signal processing may arise is in an audio signal processor or processing system. Such a system may perform various signal processes and ultimately output an audio signal to be played by a speaker or the like. However, since the human ear is forgiving of various signal fluctuations, then likewise the signal processing involved may have a lesser standard of precision than is required of the above-mentioned examples of a hand held calculator or central processing unit. Consequently, the present embodiments have particular application for this and other instances of signal processing that require less than exact signal evaluation.

By way of further background, it is noted that some contemporary digital processing systems implement relatively costly solutions to signal processing. For example, the present embodiments provide approximations to the functions of a reciprocal. Thus, where the present embodiments are not used, alternative systems may require sophisticated arithmetic logic units or the like to perform these functions. Such approaches may cause numerous problems, such as increasing device size, complexity, and consequently, device cost. Moreover, in some implementations these increases are simply unacceptable, in which case designs in their entirety may have to be discarded or, at a minimum, considerably altered given the overall system specifications.

In view of the above, there arises a need to address the drawbacks of prior systems which require complex implementations to determine reciprocal-related functions, and to provide efficient circuits, systems, and methods for determining an acceptable approximation for such functions.

BRIEF SUMMARY OF THE INVENTION

In one embodiment there is a digital signal system for determining an approximate reciprocal of a value of x. The system includes circuitry for identifying a bounded region within which x falls. The bounded region is one of a plurality of bounded regions, and each bounded region has a corresponding slope value and first and second endpoints. The system further includes circuitry for determining the approximate reciprocal by determining an offset from a reciprocal value at one of the first and second endpoints by a measure equal to a distance of the value of x from the one of the first and second endpoints times the slope value corresponding to the bounded region within which x is identified as falling. In the system the value of x has a base b. Further, each of the plurality of bounded regions corresponds to a different value of an integer n and is bounded on a lower side by the first endpoint $b^n$ and on a higher side by the second endpoint $b^{n+1}$. Finally, the circuitry for identifying a bounded region within which x falls determines the value of n. Other circuits, systems, and methods are also disclosed and claimed.

DETAILED DESCRIPTION OF THE INVENTION

Figure 1:
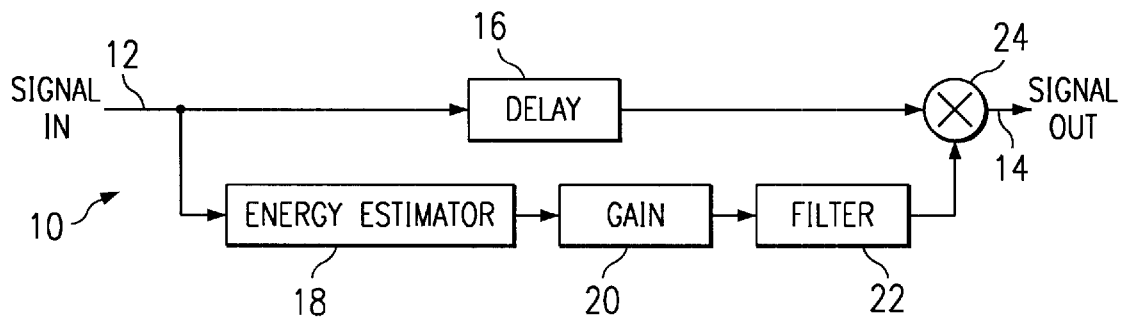
FIG. 1 illustrates a block diagram of a dynamic range compressor within which the preferred embodiments may be implemented.

FIG. 1 illustrates a block diagram of a dynamic range compressor 10, and which is shown by way of illustration as a signal processing device in which the preferred embodiments may be implemented. Dynamic range compressor 10 receives an audio signal at a signal input 12 and, as demonstrated below, provides an output signal at an output 14 in response to the input signal. Before detailing the relationship of the input and output signals, first consider the signal path between input 12 and output 14, which is as follows. Input 12 is connected to the input of a delay circuit 16, and also to the input of an energy estimator 18. The output of energy estimator 18 is connected to the input of a gain circuit 20. The output of gain circuit 20 is connected to the input of a filter 22. The output of filter 22 is connected to an input of a combiner 24, which also has an input connected to receive the output of delay circuit 16. Lastly, each block of dynamic range compressor 10 is shown to demonstrate the overall operation of the device, and from this discussion as well as the skill in the art various circuits may be constructed to achieve this operation. Moreover, while the blocks are separately shown, note that some of the functions of the blocks may be combined or overlap, particularly in view of the type of device or devices used to implement the compressor.

The operation of dynamic range compressor 10 is now described generally, with a more detailed discussion below. Generally, compressor 10 operates to provide an output signal which has an amplitude swing that is more limited than what is expected of the input signal. In other words, a device such as dynamic range compressor 10 is typically included in a system where there are components within the system that are limited in a manner that cannot handle the anticipated amplitude swing of the input signal at input 10; thus, dynamic range compressor 10 operates to attenuate, or "compress", that swing so that the limitations of these components are not reached. For example, in an audio environment, the output signal may be used to drive a speaker via an A/D converter and appropriate amplification. Thus, any of these devices may have a limited input range, and by using dynamic range compressor 10 these limits may be avoided so as not to damage the device or cause undesirable operation.

Looking in more detail to the operation of compressor 10, the input signal is delayed by delay circuit 16, and at the same time is processed by the series of circuits consisting of energy estimator 18, gain circuit 20, and filter 22 Thereafter, the result of these series of circuits is used to modify the delayed signal via combiner 24, and the ultimate result is the output signal at output 14. Turning to the details of the operation of the series of circuits, energy estimator 18 determines a measure of the energy of the input signal. In this regard, one measure analysis is in the context of a root mean square ("RMS") evaluation. More specifically, the input signal is measured by energy estimator 18, and one of its attributes (e.g., amplitude) is represented by a measurement which, for purposes of the following discussion, is represented by a value i. Next, an RMS evaluation is made, and as known in the art in some systems, such an evaluation is in units of dB, and dB are determined in view of a logarithm as shown in the following Equation 1:

$$dB = 20\log_{10}(i) \qquad \text{Equation 1}$$

However, note that the present inventor also contemplates a dynamic range compressor where the energy estimation does not involve a logarithmic determination. In this regard, the reader is invited to review for more detail U.S. patent application Ser. No. 09/408,097 filed on Sep. 27,1999 , having the same sole inventor as the present application, and hereby incorporated herein by reference. In any event, the energy estimate of estimator 18 is next used to determine the gain to be applied by gain circuit 20. Generally speaking, gain circuit 20 operates so that for a certain range of input signals, the gain is simply 1, that is, the output signal matches the input signal in amplitude (i.e., for every 1 dB in there is 1 dB out). However, for an input signal having an energy beyond a certain threshold, the output is attenuated, for example, such that there is 1 dB out for every N dB in, where N exceeds 1. Still further, for some compressors, additional thresholds may be set where, for each such threshold, there is another scale factor implemented by gain circuit 20 and, hence, additional levels of attenuation for even larger input signals. In any event, the adjustment by gain circuit 20 in certain prior systems is achieved in part through the use of an inverse logarithm. However, in the above-incorporated patent application it is shown how the energy estimate is applied to adjust gain, and in this regard a value relating to the input signal x must be modified to provide a reciprocal of x, that is, to find 1/x. Moreover, because this adjustment ultimately relates to an adjustment in an audio signal, note that it has been found that the actual reciprocal may not be required but, instead, an approximation of the reciprocal provides satisfactory results. Accordingly, the example of a dynamic range compressor gives rise to an application of the present inventive teachings, which implement an approximation of a reciprocal. In any event, this reciprocal and possibly other factors are used to provide an adjusted signal and the adjusted signal from gain circuit 20 is passed to filter 22. Filter 22 operates to smooth the transitions which may arise from gain circuit 20. In the context of audio operations, therefore, filter 22 preferably prevents any stark change in signal output which could be detected by the human ear. Specifically, filter 22 uses different time constants based on whether the gain is increasing or decreasing, where these time constants relate to what is referred to in the art as attack and decay. Lastly, the signal output from filter 22 is combined via combiner 24 with the delayed input signal output by delay circuit 16, thereby presenting an output signal at output 14 for driving a speaker via an A/D converter and appropriate amplification.

Attention is now directed to the preferred methodologies for approximating the value for a reciprocal of a value of x. Thus, by way of introduction, it is the purpose of the following discussion to provide an approximation for f(x) in the following Equation 2:

$$f(x) = \frac{1}{x} \qquad \text{Equation 2}$$

Figure 2:
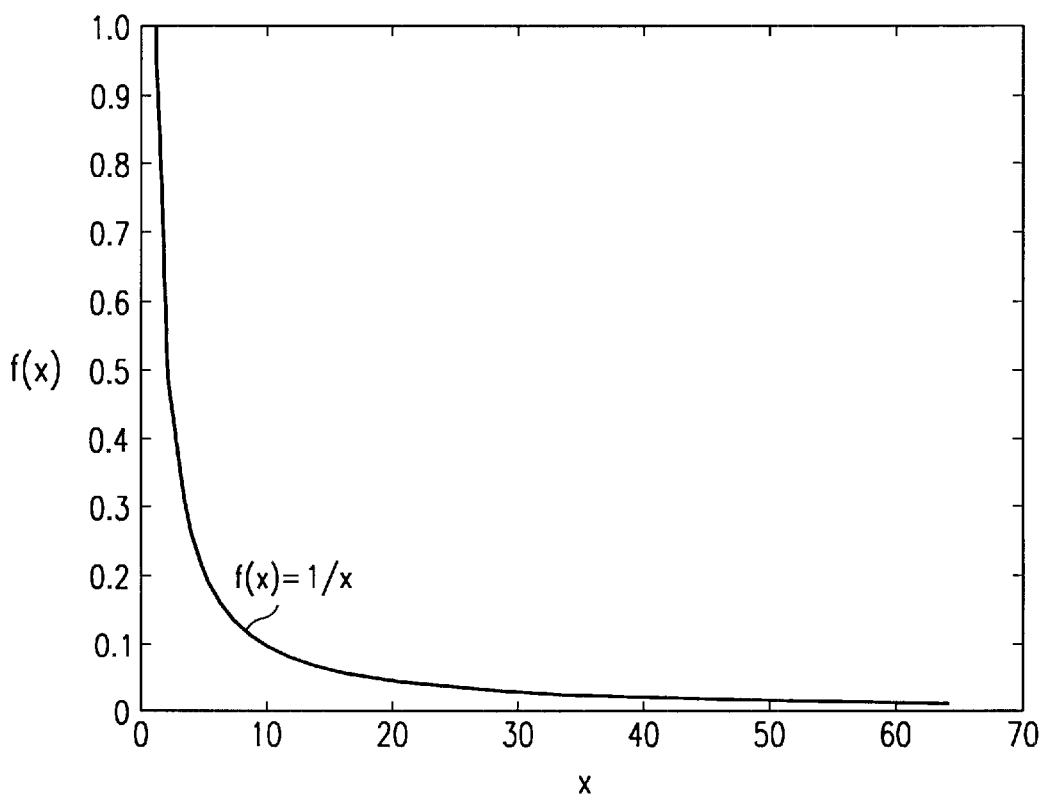
FIG. 2 illustrates a plot of f(x) for the function of 1/x.

Further to the introduction, a plot of Equation 2 is helpful and, as a result, FIG. 2 illustrates such a plot. Looking to FIG. 2 in more detail, it plots the value of f(x) in the vertical dimension, while its horizontal dimension plots the value of x. The typical reciprocal illustration of FIG. 2 lends itself to some general observations, at least given the scaling as set forth in the Figure. Specifically, it is readily appreciated that the slope of f(x) may be characterized by two almost linear portions, with one line existing for values of x below approximately 5, and with another line existing for values of x above approximately 20. Thus, for x between 5 and 20, f(x) provides a considerably more non-linear sloped region.

As illustrated later, the present embodiments are preferably implemented in a digital system and, hence, at its lowest level, may be considered in view of the base 2 system Further capitalizing on this notion, the following Table 1 is provided and also characterizes some values shown in FIG. 2, from which additional observations are made giving rise to the preferred embodiment.

TABLE 1

| n | $x_L$ | $x_H$ | $f(x_L)$ | $f(x_H)$ |
|---|---|---|---|---|
| 0 | 1 | 2 | 1 | 0.5 |
| 1 | $2 = 1 \times 2^1$ | $4 = 2 \times 2^1$ | $0.5 = 1/2$ | $0.25 = 0.5/2^1$ |
| 2 | $4 = 1 \times 2^2$ | $8 = 2 \times 2^2$ | $0.25 = 1/2^2$ | $0.0125 = 0.5/2^2$ |
| 3 | $8 = 1 \times 2^3$ | $16 = 2 \times 2^3$ | $0.125 = 1.2^3$ | $.0625 = 0.5/2^3$ |
| . . . . . . | . . . | . . . | . . . | . . . |

TABLE 1-continued

| n | $x_L$ | $x_H$ | $f(x_L)$ | $f(x_H)$ |
|---|---|---|---|---|
| 15 | $\frac{32768}{[327]} = 1 \times 2^{15}$ | $\frac{65536}{2 \times 2^{15}} =$ | $1/2^{15}$ | $0.5/2^{15}$ |
| ... | ... | ... | ... | ... |
| n | $2^n = 1 \times 2^2$ | $2^{n+1} = 2 \times 2^n$ | $f(2^{nf}) = 1.2^n$ | $f(2^{n+1}) = 0.5/2^n$ |

In Table 1, bounded regions for x are shown where each such region is defined as $x_L:x_H$, where x is bound on its low side by a low value $x_L$ and bound on its high side by a high value $x_H$, and where each bounded region corresponds to a power of 2. In Table 1, the particular power of 2 is designated as n, as shown in the first column of the Table. For example, the top row of Table 1 illustrates the instance of a power of 2, n, equal to 0 (i.e., $2^0 = 1$), the second row from the top in Table 1 illustrates the instance of a power of 2 equal to 1 (i.e., $2^1 = 2$), and so forth Given each region, its boundaries or endpoints, $x_L$ and $x_H$, are therefore equal to $2^n$ and $2^{n+1}$, respectively.

Table 1 further demonstrates the present inventor's recognition of one aspect relating to the preferred embodiment, namely, that for each bounded region, even though it encompasses a range of x twice as large as the preceding region, its values of f(x) for endpoint of the region may be expressed in terms only of n. This relationship is shown by the last row of Table 1. For later reference, therefore, the relationship with respect to $x_L$ is shown by the following Equation 3, and the relationship with respect to $x_H$ is shown by the following Equation 4:

$$\text{for } x_L, f(x_L) = f(2^n) = 1/2^n \qquad \text{Equation 3}$$

$$\text{for } x_H, f(x_H) = f(2^{n+1}) = 0.5/2^n \qquad \text{Equation 4}$$

Further in view of Table 1, the present inventor's recognition of another aspect relating to the preferred embodiment is demonstrated by Table 2, which corresponds row-by-row to Table 1, and illustrates the slope between each successive bounded region.

TABLE 2

| n | $x_L:x_H$ | f(x) | Slope |
|---|---|---|---|
| 0 | 1:2 | 1:0.5 | $0.5 = 0.5/2^0$ |
| 1 | 2:4 | 0.5:0.25 | $0.125 = 0.5/2^2$ |
| 2 | 4:8 | 0.25:0.125 | $0.03125 = 0.5/2^4$ |
| 3 | 8:16 | 0.125:0.0625 | $0.007825 = 0.5/2^6$ |
| ... | ... | ... | ... |
| 15 | 32768:65536 | $1/(1 \times 2^{15}):1/(2 \times 2^{15})$ | $0.5/2^{30}$ |
| ... | ... | ... | ... |
| n | $2^n:2 \times 2^n$ | $1/(1 \times 2^n):1/(2 \times 2^n)$ | $0.5/2^{2n}$ |

Importantly for the preferred embodiment, Table 2 demonstrates that for each bounded region, the slope for that region may be defined solely in view of a constant (i.e., 0.5, which itself is a power of 2) and a power which relates to n (i.e., $2^{2n}$) Note further that this relationship is true even despite the fact that, as noted earlier, the slope for 1/x is somewhat linear for two majority spans of x and somewhat non-linear between those spans. Further in this regard, the demonstrated relationship is shown by the last row of Table 2, and is shown by the following Equation 5:

$$\text{for } x_L = 2^n : x_H = 2 \times 2^n, \text{ slope} = \frac{f(x_H) - f(x_L)}{x_H - x_L} = 0.5/2^{2n} \qquad \text{Equation 5}$$

Moreover, from FIG. 2, it is readily appreciated that for all increasing values of x, the slope in Equation 5 is a negative value.

Given the above, the preferred embodiment approximates the reciprocal function using the preceding observations in combination with piecewise linearization. In other words, given a value of x for which the reciprocal is desired, the reciprocal may be approximated by first identifying the region within which the value of x falls, and given that determining f(x) by multiplying the slope for that region times the distance of x from one of the endpoints of the region. Thus, if the lower endpoint, $x_L$, is used as an endpoint, then this approach may be represented by the following Equation 6:

$$f(x) \approx f(x_L) + (x - x_L) * (\text{slope for region } n) \qquad \text{Equation 6}$$

Importantly in the preferred embodiment, it was shown above and concluded by illustration in Equation 5 that in the preferred methodology the slope may be provided as a function which relates to the value of n. In other words, for a given value of x, once the bounded region within which x falls is known, that region defines a value of n and hence defines a single value of slope which may be used for that region Thus, this value of slope may be determined solely from Equation 5, and without requiring a look-up table or some other manner of storing different slope values for different values of x. Consequently, by substituting the slope determination of Equation 5 into the approximation of Equation 6, and recognizing that the slope is always negative, yields the following Equation 7:

$$f(x) \approx f(x_L) + (x - x_L) * (-0.5/2^{2n}) \qquad \text{Equation 7}$$

Moreover, the second column of Table 1 demonstrates that $x_L$ may be defined in terms of n as shown in the following Equation 8:

$$x_L = 2^n \qquad \text{Equation 8}$$

Substituting Equations 3 and 8 into Equation 7 yields the following Equation 9:

$$f(x) \approx 1/2^n - (x - 2^n) * (0.5/2^{2n}) * = 2^{-n} - (x - 2^n) * (2^{-2n-1}) \qquad \text{Equation 9}$$

From Equation 9, and for purposes demonstrated in the preferred embodiment described below, a factor of $2^{-n}$ may be removed from each term, thereby providing the following Equation 10:

$$f(x) \approx 2^{-n}[1 - (x - 2^n)(2^{-n-1})] \qquad \text{Equation 10}$$

From the preceding and concluding with Equation 10, the preferred embodiment implements a digital system for approximating a reciprocal by implementing Equation 10. More specifically, given a value of x, then the reciprocal f(x) is approximated, as will be further appreciated later.

In the effort to solve Equation 10, it is important to note that such a solution requires a mechanism for determining n given a particular value of x. One technique for such a determination is by taking the integer portion of a logarithm, because it is evident above that the following Equation 11 holds true as n has been presented:

$$n = \text{int}\{\log_2(x)\} \qquad \text{Equation 11}$$

For example, if x=43, then $\log_2(43)$=5.426 and n equals 5. In other words, $2^5 \leq 43 \leq 2^6$. This approach, however, requires an evaluation of a logarithm, which itself may be fairly complex to implement, or may require valuable use of resources (e.g., arithmetic logic unit) which are either unavailable or undesirable to burden. As a result, while taking a logarithm provides one embodiment, the preferred embodiment implements an alternative approach to determining n given x, as detailed immediately below.

The preferred embodiment uses the advantage arising from the realization that for a number represented in binary form, the value of n in the preceding Equations is equal to the location of the most significant non-zero bit in a binary representation of x. To demonstrate this notion with an example, consider again the case where x=43; for this example, then the value of x in an eight-bit binary representation is shown immediately below in Table 3, which also identifies the position of each bit in the representation.

TABLE 3

| Binary value for x = 43 | 0 | 0 | 1 | 0 | 1 | 0 | 1 | 1 |
|---|---|---|---|---|---|---|---|---|
| Bit position | 7 | 6 | 5 | 4 | 3 | 2 | 1 | 0 |

In Table 3, note that bits are listed with the more significant bits to the left and the lesser significant bits to the right, and this convention is followed through the remainder of this document; however, this convention is also only by way of illustration and one skilled in the art will appreciate that the present teachings equally apply where the bits are arranged in opposite order. Given this convention and the illustration of Table 3, it is seen that the most significant non-zero bit in the binary representation occurs in bit position 5. Thus, consistent with the premise introduced at the outset of this paragraph, the value of n in the earlier Equations equals that most significant non-zero bit position, and for x=43, therefore n=5 (i.e., $2^2=2^5$). For purposes of the remainder of this document, this digit, that is, the one in the position of the most significant non-zero bit, is referred to as a most significant digit ("MSD"). Accordingly, for later reference, the equality of it and the MSD is stated in the following Equation 12:

$$n = MSD \qquad \text{Equation 12}$$

Lastly, the preferred techniques for determining the MSD are discussed later.

To further demonstrate the equality of n and the MSD, a few more examples are illustrative. Accordingly, assume that x=70. Thus, the binary representation of 70 is as shown in the following Table 4:

TABLE 4

| Binary value for x = 70 | 0 | 1 | 0 | 0 | 0 | 1 | 1 | 0 |
|---|---|---|---|---|---|---|---|---|
| Bit position | 7 | 6 | 5 | 4 | 3 | 2 | 1 | 0 |

From Table 4, therefore, the MSD for x=70 is 6. Thus, under the above proposition, this MSD of 6 is also equal to n. This may be confirmed through a calculator or the like, which indicates that $\log_2(70)$=6.129. In other words, in terms of the earlier Equations, n equals 6. As one final example, assume that x=31. Thus, the binary representation of 31 is as shown in the following Table 5:

TABLE 5

| Binary value for x = 31 | 0 | 0 | 0 | 1 | 1 | 1 | 1 | 1 |
|---|---|---|---|---|---|---|---|---|
| Bit position | 7 | 6 | 5 | 4 | 3 | 2 | 1 | 0 |

From Table 5, therefore, the MSD for x=31 is 4. Thus, under the above proposition of Equation 12, this MSD of 4 is also equal to n. This may be confirmed through a calculator or the like, which indicates that $\log_2(31)$=4.954. From the preceding, therefore, as well as other examples that may be performed by one skilled in the art, it is shown that by determining the MSD given a binary representation, then a methodology for determining n in the Equations has been provided.

Having presented the above, note that another way of stating the relationship between n and x is through the floor function, which is a function that is solved by rounding the result to the nearest integer towards minus infinity. Thus, the relationship between n and x using the floor function is shown in the following Equation 13:

$$n = \lfloor \log_2(x) \rfloor \qquad \text{Equation 13}$$

Thus, the floor function provides another manner of determining n, although it should now be appreciated that in the present embodiments the result is the same therefore as locating the MSD.

Figure 3:
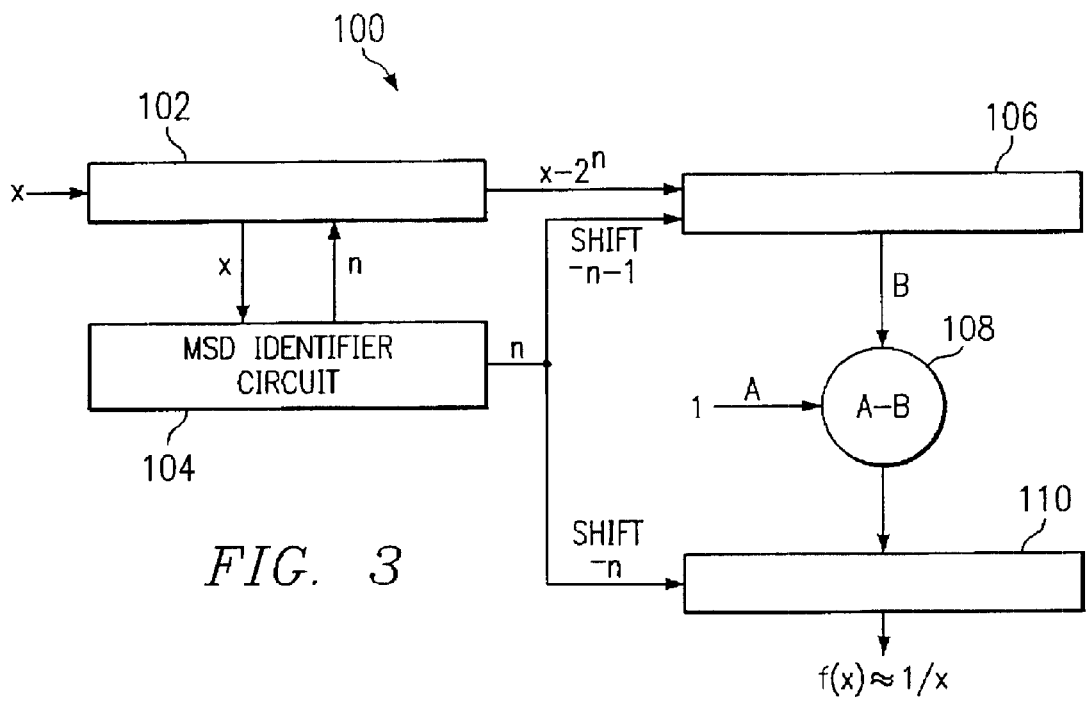
FIG. 3 illustrates a block diagram of a digital system for approximating a reciprocal.

Given a preferred methodology for determining n, the present discussion now turns to a digital system for implementing this method, as well as completing the reciprocal estimation provided above by Equation 10. Particularly, FIG. 3 illustrates a block diagram of a reciprocal approximation system 100. Thus, system 100 may be incorporated, by way of example, into gain circuit 20 in FIG. 1 to provide the gain adjustment functionality of that circuit for reasons discussed earlier. Turning now to system 100, it includes a storage device 102 (e.g., register or memory space) for storing the binary representation of x. Storage device 102 is coupled to provide its full value to an MSD identifier circuit 104, and MSD identifier circuit 104 reports the value of n back to storage device 102 as detailed below. Additionally, storage device 102 is coupled to provide the value of $x-2^n$ to a shift register 106. In this regard, recall from above that $2^n = 2^{MSD}$. In a binary standpoint, therefore, $2^{MSD}$ is represented by the MSD followed by all binary zeros. Consequently, for a binary representation of x, its bits may be thought of as a combination of $2^{MSD}$ and a set of remaining bits of lesser significance than the MSD, and therefore these remaining lesser significant bits by themselves equal $x-2^n$. Consequently, to represent the value of $x-2^n$, the present embodiment toggles the MSD in register 102 from 1 to 0, and from the above one skilled in the art will appreciate that the remaining bit representation therefore constitutes the value of $x-2^n$. As stated above, this value is presented to shift register 106, which has a shift input coupled to receive the value of $-n-1$ from MSD identifier circuit 104. Alternatively, note that shift register 106 could receive the value of n and include sufficient circuitry, or be coupled to such circuitry, to determine from n the value of $-n-1$, where this determined value is important for reasons discussed below. In any event, other alternatives for deriving $x-2_n$ from storage device 102 may be implemented, such as identifying the MSD in storage device 102 and then copying only the bits which are less significant than the MSD to shift register 106. Shift register 106 couples its output as a value B to a subtractor 108, which performs an evaluation of A−B, where the A input is coupled to receive a value of 1. The output of subtractor 108 is coupled to a shift register 110, which has a shift input coupled to receive the value of −n from MSD identifier circuit 104, or is coupled to receive the value of n from MSD identifier circuit 104 and further includes circuitry to determine the negative value, −n, from the value of n provided by MSD identifier circuit 104. The output of shift register 110 provides the approximated solution to Equation 10, namely, the approximate reciprocal of x.

The operation of system 100 given the preceding teachings is best summarized in view of Equation 10, and begins with MSD identifier circuit 104. MSD identifier circuit 104 determines the location of the MSD in register 102. In this regard, MSD identifier circuit 104 may be implemented in various manners. For example, MSD identifier circuit 104 may include a shift register which copies into it the value of x from register 102, and then successively shifts the copied value to the right while checking after each shift to identify once the shifted value equals one. As an another alternative, the shift register could shift the value of x to the left while checking after each shift to identify once the shifted value equals or exceeds the largest power of 2 which may be stored in the register. As an another alternative approach to implementing MSD identifier circuit 104, it could include a logic circuit that implements a truth table based on a word of w bits stored in register 102, and that provides an output word that identifies the MSD in the w-bit word. As still another approach, a binary search technique could be used that, by way of example, searches portions of the word stored in register 102 and then eliminates various portions to eventually converge on the location of the MSD. In any event, once the MSD is identified, this value of MSD=n is reported to register 102 to thereby identify the remaining bits in register 102 where from the preceding discussion it is noted that these remaining bits equal $x-2^n$. Accordingly, from this determination, the value of $x-2^n$ is output to shift register 106. In addition, identifier circuit 104 reports the value of −n−1 to shift register 106, which operates as described below.

Shift register 106 shifts the value of $x-2^n$ received from register 102 according to the value of −n−1, and this shifting achieves the effect of the multiplication times $2^{-n-1}$ from Equation 10. Specifically and as known in the digital art, a multiplication of a factor times 2 to a positive power may be achieved by shifting the factor to the left a number of times equal to the positive power, and a multiplication of 2 to a negative power may be achieved by shifting the factor to the right a number of times equal to the negative power. Accordingly, in the present embodiment such shifting operations are achieved using shift register 106 in response to the value of −n−1. As a result, the factor of $2^{-n-1}$ from Equation 10 is performed without requiring an actual calculation involving an exponent and without a multiplier operation; instead, these operations are achieved by shifting the value of $x-2^n$ in the direction dictated by the value of −n−1. Thus, this provides an illustration of the benefit of factoring Equation 10 to include the factor of $2^{-n-1}$ as was done earlier. The shifted result is then provided to subtractor 108, which operates as described below.

As introduced above, subtractor 108 performs the equation of A−B, where the A input is coupled to receive a value of 1. In this regard, since subtractor 108 merely subtracts a value from 1 in each of its operations, it may be logic which is less complicated than a typical full operation subtractor circuit or arithmetic logic unit. In any event, given the preceding operations, note that the result from the subtraction represents the solution to the items within the square brackets of Equation 10. This resulting output is coupled to shift register 110, for the final operation described below.

Shift register 110 operates in a manner similar to shift register 106, but here the shift is with respect to the value of −n as opposed to −n−1. Briefly, therefore, shift register 110 shifts the bracket value of Equation 10, as provided from subtractor 108, in response to the value of −n, and this shifting achieves the effect of the multiplication times $2^{-n}$ from Equation 10. Accordingly, in the present embodiment such shifting operations are achieved using shift register 110 in response to the value of −n, and the multiplication factor of $2^{-n}$ from Equation 10 is effectively achieved without requiring an actual calculation involving an exponent and without a multiplier operation. Thus, this provides an illustration of the benefit of factoring Equation 10 to include the factor of $2^{-n}$ as was done earlier. The result from shift register 110 is the approximation from Equation 10 and, thus, is the approximation of 1/x.

Figure 4:
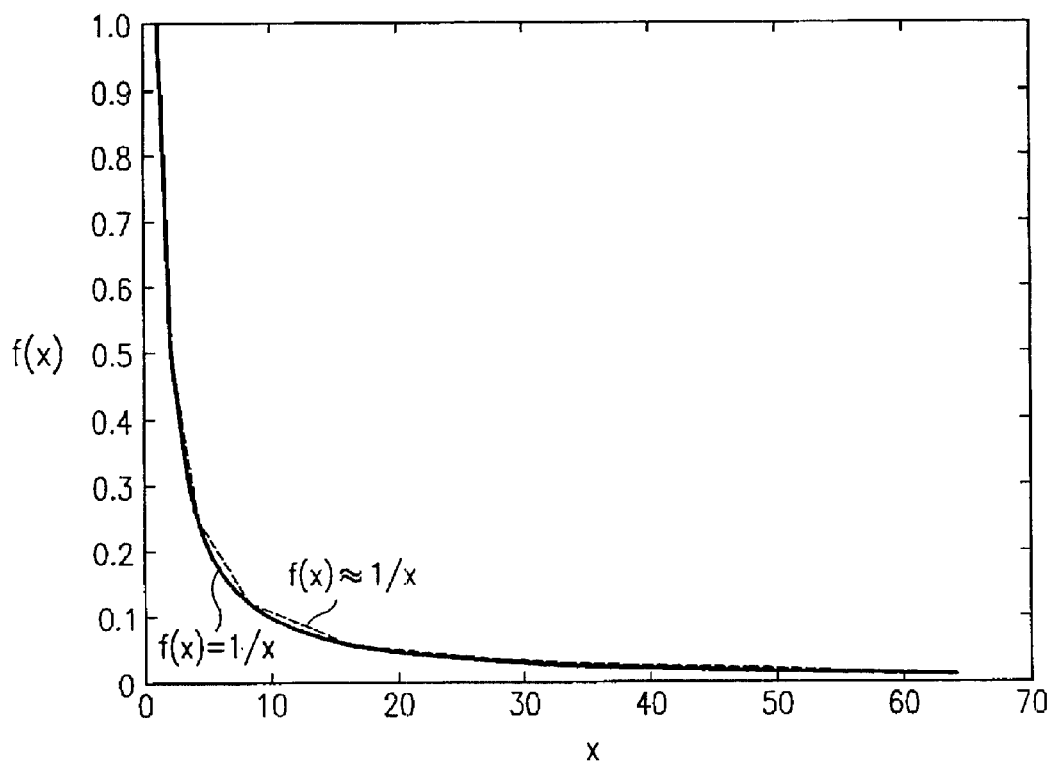
FIG. 4 illustrates a plot which relates the approximation of the reciprocal as achieved by the system of FIG. 3 by demonstrating its relationship to the plot of FIG. 2.

As another illustration of the aspects of the present embodiments, FIG. 4 again illustrates the plot of FIG. 2 which, recall is the actual reciprocal value f(x) in the vertical dimension and the value of x in the horizontal dimension. In addition, FIG. 4 includes a second plot depicting the results of Equation 10, as may be produced by system 100 or other systems within the present inventive scope. From a visual standpoint, therefore, various observations may be made about the results achieved by system 100. First, the area between the plots may be viewed as the overall amount of error between the actual reciprocal and the approximation of the reciprocal Accordingly, it may be appreciated that this error is relatively small, and particularly for certain values of x. Indeed, it may be appreciated further that the error reduces within each bounded region corresponding to a value of n at the endpoints of x within that region. This result should be expected since Tables 1 and 2, and Equation 10 which derives from those Tables, are based on a methodology deriving from the use of endpoints for each bounded region of x. In addition, it also may be seen that for values of x where the slope of its actual reciprocal is more linear, the amount of error between the actual and approximated reciprocals is relatively lower than the error where the slope is more non-linear.

The prior discussions relative to approximating a reciprocal have been set forth without explicitly addressing the sign of the value of x; thus, for the preceding discussion, it was implicit that that context pertained to x as a positive number. However, further within the present embodiments is the notion that the teachings of this document also apply to approximating the reciprocal of a negative number, where the only modification required is approximating the reciprocal of the absolute value of that number, and then making the result negative. Thus, if x is presented as a negative value, then the preceding teachings also apply thereto, where system 100 is modified accordingly. For example, such modifications include sufficient circuitry to detect the negative number (e.g., a checking circuit connected to examine the sign bit in the binary representation of x as stored in register 102), and then to perform the same operations described above with respect to the absolute value of that negative number. Once the positive result is achieved, then a negative sign is simply added to the positive result, thereby providing the approximate reciprocal of the negative value of x.

As a final aside, still another modification for system 100 is contemplated to avoid problems for the case where x equals zero. In this case, clearly the reciprocal, in a mathematical sense, is undefined. Accordingly, to achieve a stable system, yet another modification to system 100 provides a zero detection operation with respect to the value stored in register 102. If such a value is detected, then an appropriate response should be included, such as prohibiting the remainder of the circuitry therein from attempting to provide a solution to the undefined instance where x equals zero. Indeed, an additional operation in this instance could occur whereby some alarm indicator or some other function is provided to warn the user, or otherwise prevent the system from operating, in response to this undefined mathematical operation.

From the above, it may be appreciated that the above embodiments provide numerous advantages and alternatives to implement approximations for reciprocals. However, while the present embodiments have been described in detail, one skilled in the art should appreciate that various substitutions, modifications or alterations could be made to the descriptions set forth above without departing from the inventive scope. For example, while FIG. 1 illustrates a dynamic range compressor, the present embodiments will apply to other circuits relating to audio signal processing. Indeed, it is further likely that the present embodiments are operable in connection with processing other signal types. As another example, while FIG. 3 illustrates a specific hardware implementation of the methodologies provided, still other hardware or combined hardware and software implementations will be ascertainable by one skilled in the art. As yet another example, while Equation 6 and the subsequent discussion was directed to a slope evaluation relative to the lower endpoint $x_L$ of the bounded region within which x falls, the present teachings also could be adapted to a determination made based on the upper endpoint, $x_H$, as well. As yet another example, note that the embodiments above are primarily directed to base 2 determinations, as such arise often in the binary context and benefit in the present context from the ability to use the MSD for the reasons described earlier. Nevertheless, many of the present teachings may well apply directly to base 10 or other number based systems. Thus, these examples as well as others as may be determined by one skilled in the art further illustrate the present inventive scope, as is defined by the following claims.

What is claimed is:

1. A digital signal system for determining an approximate reciprocal of a value of x, comprising:
    circuitry for identifying a bounded region within which x falls, wherein the bounded region is one of a plurality of bounded regions and wherein each bounded region has a corresponding slope value and first and second endpoints; and
    circuitry for determining the approximate reciprocal by determining an offset from a reciprocal value at one of the first and second endpoints by a measure equal to a distance of the value of x from the one of the first and second endpoints times the slope value corresponding to the bounded region within which x is identified as falling
    wherein the value of x has a base b;
    wherein each of the plurality of bounded regions corresponds to a different value of an integer n and is bounded on a lower side by the first endpoint $b^n$ and on a higher side by the second endpoint $b^{n+1}$; and
    wherein the circuitry for identifying a bounded region within which x falls determines the value of n.

2. The system of claim 1 wherein the base b equals 2.

3. The system of claim 2 wherein the circuitry for identifying the bounded region identifies the bounded region in response to a most significant digit of a binary representation of the value of x.

4. The system of claim 1 wherein the circuitry for identifying the bounded region identifies the bounded region in response to a most significant digit of a binary representation of the value of x.

5. The system of claim 1 and further comprising circuitry for storing x as a binary representation.

6. The system of claim 1:
    wherein the one of the first and second endpoints is the first endpoint $b^n$.

7. The system of claim 1:
    wherein the one of the first and second endpoints is the second endpoint $b^{n+1}$.

8. The system of claim 1:
    wherein each bounded region has a corresponding slope value equal to $0.5/2^{2n}$.

9. The system of claim 8 wherein the base b equals 2.

10. The system of claim 1:
    wherein the reciprocal value at the first endpoint $b^n$ is equal to $1/2^n$.

11. The system of claim 10 wherein the base b equals 2.

12. The system of claim 10:
    wherein the reciprocal value at the second endpoint $b^{n+1}$ is equal to $0.5/2^n$.

13. The system of claim 12 wherein the base b equals 2.

14. The system of claim 1:
    wherein the reciprocal value at the second endpoint $b^{n-1}$ is equal to $0.5/2^n$.

15. The system of claim 1:
    wherein the value of x is represented in a binary representation having a most significant digit and one or more lesser significant bits; and
    wherein the circuitry for determining the approximate reciprocal determines the offset from the reciprocal value at the first endpoint by forming a product between the slope value corresponding to the bounded region within which x is identified as falling and the one or more lesser significant bits.

16. The system of claim 15 wherein the circuitry for determining the approximate reciprocal further determines the offset from the reciprocal value at the first endpoint by adding the product to the reciprocal value at the first endpoint to produce a result, wherein the result is the approximate reciprocal of the value of x.

17. The system of claim 1 wherein the value of x relates to an attribute of an audio signal.

18. The system of claim 17 wherein the attribute of the signal is a signal energy.

19. The system of claim 1 wherein the value of x is a positive number.

20. The system of claim 1 and further comprising:
    circuitry for detecting whether x is a positive or negative number; and
    responsive to detecting that x is a negative number, circuitry for converting the negative number to a positive number equal to an absolute value of the negative number.

21. A method of determining an approximate reciprocal of a value of x, comprising:
    identifying a bounded region within which x falls, wherein the bounded region is one of a plurality of bounded regions and wherein each bounded region has a corresponding slope value and corresponds to a different value of an integer n and is bounded on a lower side by a first endpoint $b^n$ and on a higher side by a second endpoint $b^{n+1}$;

determining the approximate reciprocal by determining an offset from a reciprocal value at one of the first and second endpoints by a measure equal to a distance of the value of x from the one of the first and second endpoints times the slope value corresponding to the bounded region within which x is identified as falling;

wherein the value of x has a base b;

wherein each bounded region has a corresponding slope value equal to $0.5/2^{2n}$;

wherein the value of x is represented in a binary representation having a most significant digit and one or more lesser significant bits; and wherein the step of identifying the bounded region identifies the bounded region in response to the most significant digit of the binary representation of the value of x.

22. The method of claim 21 wherein the step of determining the approximate reciprocal determines the offset from the reciprocal value at the first endpoint by forming a product between the slope value corresponding to the bounded region within which x is identified as falling and the one or more lesser significant bits.

23. The method of claim 22 wherein the step of determining the approximate reciprocal further determines the offset from the reciprocal value at the first endpoint by adding the product to the reciprocal value at the first endpoint to produce a result, wherein the result is the approximate reciprocal of the value of x.

* * * * *